US006895118B2

(12) United States Patent
Valente et al.

(10) Patent No.: US 6,895,118 B2
(45) Date of Patent: May 17, 2005

(54) METHOD OF CODING DIGITAL IMAGE BASED ON ERROR CONCEALMENT

(75) Inventors: Stephane Edouard Valente, Paris (FR); Cecile Dufour, Paris (FR)

(73) Assignee: Koninklijke Philips Electronics N.V., Eindhoven (NL)

( * ) Notice: Subject to any disclaimer, the term of this patent is extended or adjusted under 35 U.S.C. 154(b) by 564 days.

(21) Appl. No.: 10/086,741

(22) Filed: Mar. 1, 2002

(65) Prior Publication Data

US 2003/0031261 A1 Feb. 13, 2003

(30) Foreign Application Priority Data

Mar. 6, 2001 (FR) .............................................. 01 03047

(51) Int. Cl.[7] .............................................. G06K 9/36
(52) U.S. Cl. ..................................................... 382/232
(58) Field of Search ................................ 382/232–233, 382/236, 238–239, 240, 248, 250–252; 348/384.1, 390.1, 391.1, 394.1, 395.1, 400.1–404.1, 407.1–416.1, 420.1, 421.1, 425.1, 430.1, 431.1; 375/240, 240.01, 240.02, 240.12–240.2, 240.24–240.28

(56) References Cited

U.S. PATENT DOCUMENTS

| 5,455,629 | A | * | 10/1995 | Sun et al. ............... 375/240.27 |
| 6,359,121 | B1 | * | 3/2002 | Ebenezer et al. ........... 534/634 |
| 6,445,823 | B1 | * | 9/2002 | Liang ......................... 382/232 |
| 6,480,543 | B1 | * | 11/2002 | Pau et al. ............... 375/240.16 |
| 6,658,157 | B1 | * | 12/2003 | Satoh et al. ................ 382/239 |
| 6,690,833 | B1 | * | 2/2004 | Chiang et al. .............. 382/236 |

OTHER PUBLICATIONS

"Geometric–Structure–Based Error Concealment with Novel Applications in Block–Based Low–Bit–Rate Coding" by W. Zeng and B. Liu in IEEE Transactions on Circuits and Systems For Video Technology, vol. 9, No. 4, Jun. 1999.

* cited by examiner

*Primary Examiner*—Jose L. Couso

(57) ABSTRACT

The invention relates to a method of coding a digital image comprising macroblocks in a binary data stream, comprising an estimation step, for macroblocks, of a capacity to be reconstructed by an error concealment method, a decision step for excluding macroblocks from the coding, a decision to exclude a macroblock from coding being made on the basis of the capacity of such macroblock to be reconstructed and a step of inserting a resynchronization marker into the binary data stream following the exclusion of one or more macroblocks.

10 Claims, 2 Drawing Sheets

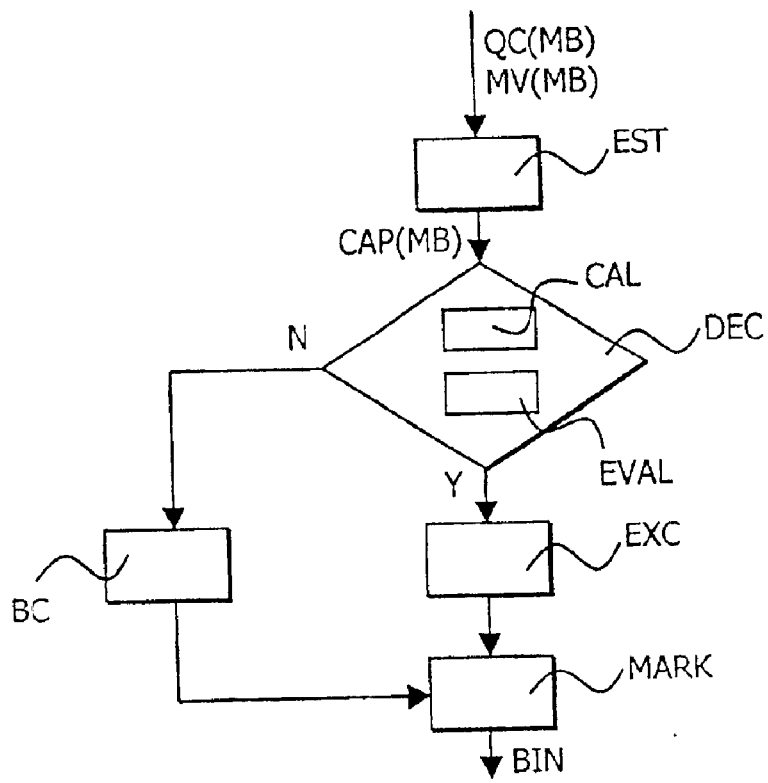
FIG.1
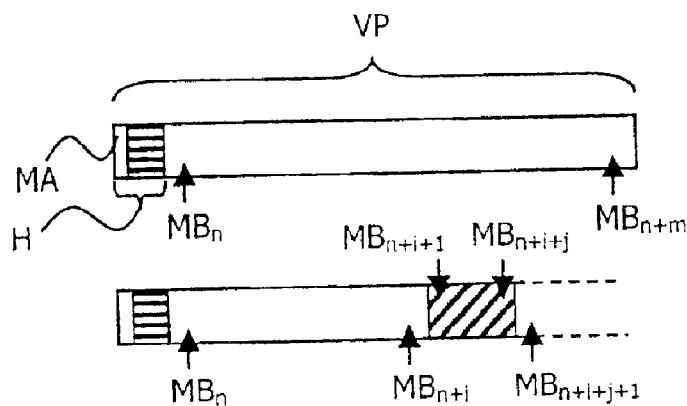
FIG.2a
FIG.2b
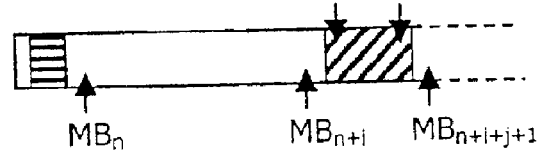
FIG.2c
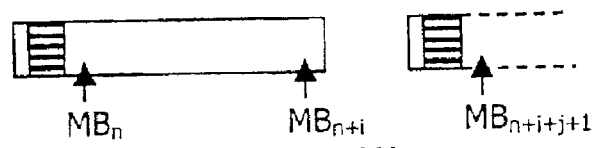
FIG.2d
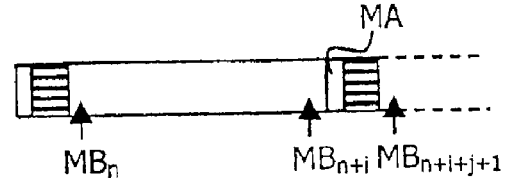

METHOD OF CODING DIGITAL IMAGE BASED ON ERROR CONCEALMENT

DESCRIPTION

The invention relates to a method of coding a digital image comprising macroblocks in a binary data stream, the method comprising:

an estimation step, for macroblocks, of capacity to be reconstructed via an error concealment method, a decision step for macroblocks to be excluded from the coding, a decision to exclude a macroblock from coding being made on the basis of the capacity of such macroblock to be reconstructed.

A coding method of such type is known from the document "Geometric-Structure-Based Error Concealment with Novel Applications in Block-Based Low-Bit-Rate Coding" by W. Zeng and B. Liu in IEEE Transactions on Circuits and Systems For Video Technology, Vol. 9, No. 4, Jun. 1999. That document describes exclusions of blocks belonging to macroblocks, block combination, said macroblocks being capable of being intercoded or intracoded. That document proposes harmonizing this block exclusion with video coding standards, either, in a first solution, by replacing uncoded blocks with constant blocks, black blocks for example, subsequently detected by the receiver, or, in a second solution, by modifying the word that defines which blocks are coded within a macroblock, such modification taking place at the same time as a modification of the address words of the macroblocks when all the blocks in a macroblock are excluded. A certain number of bits are allocated to communicate the address of the excluded blocks in the interceded macroblocks.

The invention is associated with the following considerations:

The MPEG-4 standard defines a coding syntax and proposes a certain number of tools for managing transmission errors. These tools for managing transmission errors impose certain constraints. Among these tools the MPEG-4 standard proposes tools for resynchronizing the binary data stream which periodically insert resynchronization markers into the data stream. These markers are used by the receiver which is resynchronized thanks to them during decoding. When an error occurs in the data stream, the receiver cannot read the data any more until it detects a subsequent resynchronization marker. The set formed by the marker and data between this marker and the following marker, is called a video packet. The resynchronization marker is included in a header element of the video packet. The header element also contains the number of the first macroblock of the video packet, to allow spatial resynchronization, and parameters that permit the receiver to continue decoding. The numbers of the subsequent macroblocks are not present in the data stream. Resynchronization as defined in the MPEG-4 standard can thus be qualified as point resynchronization, because it only exists for certain items of data in a stream, the rest of the stream being interpreted passively. In this case it is therefore impossible to change the addresses of the macroblocks or indicate which blocks are not coded, according to the second solution proposed in the document cited in the foregoing. All macroblocks are thus decoded and placed sequentially, giving rise to graphical "lag" errors of image elements if macroblocks have been excluded. The first solution proposed in the document cited involves detection by the decoder of the constant blocks replacing the excluded blocks. No provision for such detection is made in the MPEG-4 syntax, and this will cause graphical errors on most receivers.

It is an object of the present invention to suggest a coding method that includes an exclusion of macroblocks having a certain capacity to be reconstructed from the coding compatible with coding standards which include point resynchronization means.

Indeed, a coding method as defined in the introductory paragraph is characterized according to the invention in that it also includes a step of inserting a resynchronization marker into the binary data stream after the exclusion of one or more macroblocks.

The resynchronization marker represents a certain number of bits in the data stream (at least between 17 and 23 bits). It is a further object of the present invention to reduce the binary data stream associated with the transmission of digital images by excluding macroblocks. Given the fact that according to the invention the exclusion of one or, more generally, several macroblocks leads to the insertion of a resynchronization marker which represents a certain number of bits, this exclusion of macroblocks can contribute nothing in terms of reducing the size of the binary data stream.

In a particularly advantageous embodiment, the coding method is characterized in that the decision step includes a substep of evaluation of the reduction of the binary data stream effected by an exclusion of macroblocks, the decision to exclude macroblocks being made as a function of the reduction of the binary data stream resulting from said exclusion.

The present invention may be implemented in a coder, for example a video coder. The present invention also relates to a data stream such as is produced via a method according to the invention. In consequence, the invention also relates to a decoding method and a decoder that allows correct decoding of a data stream such as is produced by a method according to the invention. Finally, the invention relates to computer programs for implementing the various steps of the method according to the invention.

These and other aspects of the invention are apparent from and will be elucidated, by way of non-limitative example, with reference to the embodiment(s) described hereinafter.

IN THE DRAWINGS

FIG. 1 is a functional diagram representing the various steps of a coding method of a digital image comprising macroblocks in a binary data stream.

FIG. 2 shows the effect of the method according to the invention on a stream comprising coded data of a digital image comprising macroblocks.

Figure 3:
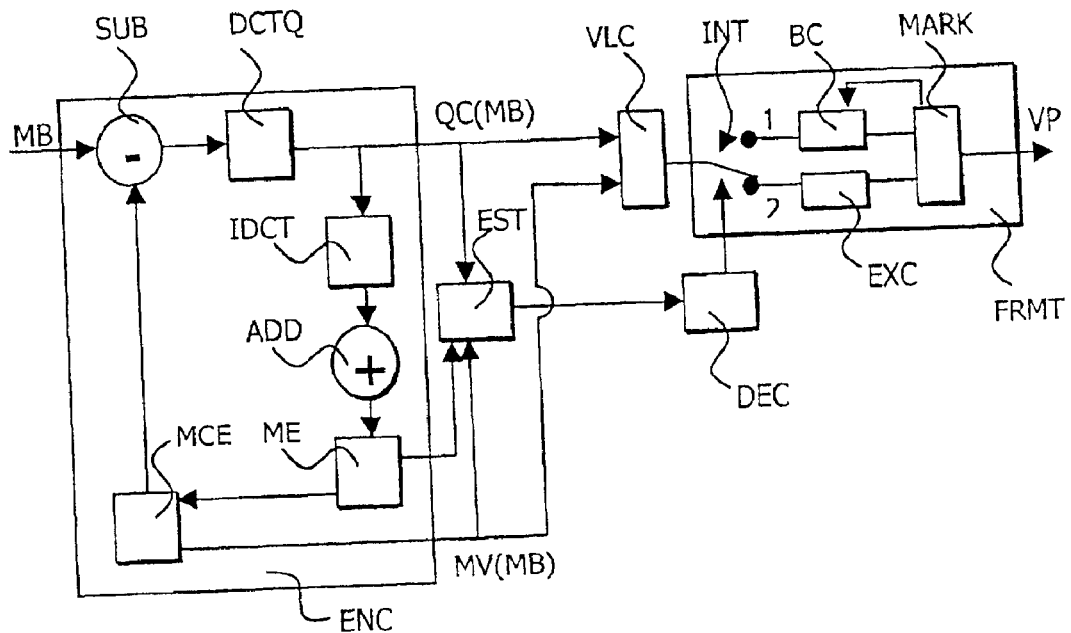
FIG. 3 is a schematic diagram of a video coder according to the invention.

FIG. 1 is a functional diagram representing the various steps of a method of coding a digital image containing macroblocks MB in a binary data stream according to the invention. In the embodiment illustrated here, the method according to the invention relates specifically to the portion of the coding that is performed on macroblocks MB that have already been converted in the form of a set of quantized coefficients QC(MB) and motion vectors MV(MB). It is these quantized coefficients QC(MB) and these motion vectors MV(MB) that are inserted at the beginning of the method in this embodiment. A first estimation step EST estimates a capacity CAP(MB) of the macroblocks to be reconstructed by an error concealment method. The estimation of this capacity may include various criteria.

These criteria correspond to the error concealment means available in the decoders. Accordingly, two major classes of error concealment are possible: spatial error concealment and temporal error concealment. In particular, the homogenous regions and the regions of homogenous motion tend to manifest a certain capacity to be reconstructed by an error concealment method.

For example, a first set of criteria relates to the homogenous regions and thus performs spatial error concealment: adjacent repetition of similar macroblocks in a sequence of macroblocks, or the facility with which a macroblock can be reconstructed by spatial interpolation from its neighbors. These two criteria may be practically and simply evaluated, for example, by calculating a difference between the macroblock that is considered for exclusion and one or more macroblocks that are either adjacent or spatially interpolated from the neighboring macroblocks, which calculation is performed as part of the estimation step EST.

Another set of criteria is associated with the regions of homogenous motion and performs temporal error concealment. For example, macroblocks belonging to regions of homogenous motion can thus be excluded, while the motion vectors of the neighboring macroblocks can be used to interpolate the excluded macroblocks. This criterion may be evaluated by calculating a difference between motion vectors of neighboring macroblocks and between quantization coefficients of a residual signal of the macroblocks from one image to the next.

The capacity CAP(MB) may thus be estimated by very diverse means that are known to one skilled in the art. The capacity CAP(MB) coming from the estimation step EST, may be in binary form or may be a number whose value is determined, for example, by the degree to which the macroblock considered for exclusion differs from an interpolated macroblock.

The method according to the invention then includes a decision step DEC regarding exclusion of macroblocks from coding. This decision is made on the basis of the capacity CAP(MB) of the macroblocks to be reconstructed. If capacity CAP(MB) is binary, the macroblock is excluded for a certain bit value, if capacity CAP(MB) is a number, the macroblock is excluded, for example, for capacity values that exceed a predetermined threshold. This predetermined threshold may be fixed or modulated depending on the resources available for transmission as will be described in the following. These conditions regarding capacity CAP (MB) define "good" reconstruction capacity in the following of the description.

In a particularly advantageous embodiment of the invention, the decision step comprises a substep wherein the reduction in size of the binary data stream resulting of an exclusion of macroblocks is evaluated, the decision on whether to exclude macroblocks being based on a criterion of the reduction of the binary data stream such exclusion. This step is justified by the fact that the insertion of the resynchronization marker entails insertion of a complete header element, which represents a certain number of bits in the data stream (at least between 17 and 23 bits). A further object of the invention is to reduce the size of the binary data stream associated with the transmission of images by excluding macroblocks. Given the fact that according to the invention the exclusion of one or, more generally, several macroblocks leads to the insertion of a complete header element, which represents a certain number of bits, said exclusion of macroblocks cannot contribute anything to the reduction of the binary data stream. An evaluation of the reduction of the binary data stream effected by the exclusion of macroblocks therefore serves a practical purpose. In this step EVAL, the number of bits saved by the exclusion of a certain number of macroblocks is evaluated, this number is then compared, in the decision step DEC for example, with the number of bits represented by the insertion of a header element. The decision to exclude is made when the reduction of the binary data stream caused by the exclusion from coding of the macroblocks is not zero.

The method according to the invention advantageously includes a calculation step CAL of an output rate of the binary data stream, the decision to exclude macroblocks being made on the basis of this output rate of the binary data stream. This calculation step CAL is performed in conjunction with transmission means of the coded macroblocks that transport the binary data stream.

Said steps CAL, EST and EVAL may also be combined: for example, the result of the calculation step CAL may influence the value of the threshold that determines "good" reconstruction capacity of macroblocks, said threshold becoming increasingly stringent as the available stream becomes greater. It is thus possible to consider a step that combines the results of the evaluation step EVAL and those of the calculation step CAL for determining a threshold value for the capacities CAP(MB) beyond which macroblocks having a capacity CAP(MB) higher than this threshold are excluded in the decision step DEC.

Depending on the result of the decision step DEC, the macroblock is either inserted into the video packet in a step BC (case N) or excluded from coding in a step EXC (case Y). In step BC, the bits are counted to trigger the insertion of a resynchronization marker in a step MARK when the video packet is of sufficient size. After each step EXC, a resynchronization marker is inserted into the binary data stream in step MARK. Here, the term "synchronization marker" must be interpreted generally to include, for example in the MPEG-4 standard, such conventional markers as RESYNC, VOPStart (start of a temporal instance (plan) of a video object), GOVStart (start of a group of temporal instances of a video object), EOS (end of video session). At the end of the method a binary data stream BIN is thus obtained.

It should be noted that the way of constitution of video packets may arbitrarily use a data partitioning and that the invention is generally unaffected by the use or not or not of a data partitioning.

It should be noted that the MPEG-4 standard already proposes not to code certain macroblocks in a video object or, more generally, in a video image, indicating this absence of coding by the presence of an "uncoded" flag. The presence of this flag is interpreted by the decoders which replace the uncoded macroblock with the macroblock located in the same position in a preceding instance of the video object. In general, the instance immediately preceding the instance in question is used. As a consequence, this flag can only be used for P coded images, for which a preceding instance is available and implicitly echoed in B coded images. The insertion of a flag of this nature is therefore only useful for regions having a motion vector close to zero and for which the texture has not changed significantly from one image or instance to the next. The exclusion of macroblocks from coding according to the invention does not entail the insertion of any specific flag and the exclusion of macroblocks from coding is thus possible for all modes of I, P or B coding.

FIG. 2 illustrates the effect of the method according to the invention on a binary data stream comprising coded data of a digital image or a video object including macroblocks. FIG. 2a represents a video packet VP with a header element H including a resynchronization marker MA. The periodicity of the markers may be based on a number of macroblocks or, more advantageously, on a number of bits. The latter solution, preferably selected by the MPEG-4 standard, allows the markers to be distributed uniformly throughout the stream. In all cases, a resynchronization marker and the data that follow up to the next resynchronization marker define a video packet. When the periodicity of the markers is based on a number of bits, the length of these video packets is determined by a mechanism according to which, if the number of bits in the current video packet exceeds a threshold value, a new video packet is created at the start of the following macroblock by the insertion of a resynchronization marker.

In the MPEG-4 standard, information necessary for restarting the decoding procedure in the receiver, as well as the number n of the first macroblock MB(n) of the video packet and the quantization parameters necessary for decoding this first macroblock, are included in a header element that also contains the resynchronization marker. The number n of the first macroblock allows spatial resynchronization to be performed and the quantization parameters allow the differential decoding procedure to be resynchronized. The numbers of the subsequent macroblocks are not indicated.

In FIG. 2b the macroblocks having good capacity to be reconstructed are designated by slanted hatching. They are the j macroblocks $MB_{n+i+1}$ to $MB_{n+i+j}$. When these macroblocks are inserted in the method described in the foregoing and in FIG. 1, the construction of the video packet is interrupted by the exclusion decision EXC represented schematically in FIG. 2c. Here, the schematic representation illustrates a case without data partitioning, where the macroblocks follow one another in a simple, serial stream. Data partitioning does not contradict the principle of the invention. The resulting binary data stream in such case is shown in FIG. 2d. A resynchronization marker MA and the associated header element have been inserted in the stream at the point where the first one of the excluded macroblocks should have been, and before macroblock $MB_{n+i+j+1}$. Here, the reduction in the size of the binary data stream caused by the insertion of resynchronization marker MA and the associated header element is not zero according to FIG. 2: the bloc representing excluded macroblocks $MB_{n+i+1}$ to $MB_{n+i+j}$ is larger than the size of the inserted header element. If an evaluation step EVAL is included in the method, this exclusion of macroblocks is effected; such exclusion would not take place if an evaluation step EVAL were present and if the block representing the macroblocks had been smaller than the block including the header element.

Since the binary data stream includes coded data of a digital image comprising macroblocks, said binary data stream being such that macroblocks $MB_{n+i+1}$ to $MB_{n+i+j}$ are not coded in the binary data stream for at least one point in the binary data stream and since such uncoded macroblocks are capable of being reconstructed by an error concealment method, said binary data stream is thus characterized according to the invention in that a resynchronization marker MA is present in the binary data stream at the location in the binary data stream where the macroblocks are not coded.

FIG. 3 is a schematic diagram of a video coder according to the invention. The video coder represented in FIG. 3 receives graphic data (images) in the form of macroblocks MB. These graphic images are converted as part of a first coding stage ENC in which the information contained in the macroblocks is coded into quantized coefficients QC(MB) and motion vectors MV(MB) by a series of operations such as addition ADD, subtraction SUB, transformation DCTQ and IDCTQ, and motion estimation and compensation MCE. A memory MEM enables certain of these operations to be performed and serves to store the data (for example image data). The macroblocks may be interceded or intra-coded. The quantized coefficients QC(MB) and the motion vectors MV(MB) are sent, on the one hand, to a variable length coder VLC and, on the other, to an estimation module EST. As is shown in FIG. 3, the estimation module EST is advantageously coupled to memory MEM of the first coding stage ENC. In the coder VLC, the quantized coefficients QC(MB) and the motion vectors MV(MB) are converted to a first form for subsequent formatting. The capacity of the macroblocks to be reconstructed via an error concealment method is estimated in the estimation module EST. The capacity value is then sent to a decision module DEC connected to an interrupter INT which belongs to a formatter FRMT which formats the data it receives in the output format of the coder VLC. Depending on the capacity value CAP(MB) and, advantageously depending on the result of an evaluation step with respect to the reduction in size of the binary data stream and of a calculation step with respect to the output rate of the binary data stream, the decision module DEC switches interrupter INT between two coding paths. When the decision module DEC switches the interrupter to position 1, the video packet is constructed in conventional manner, by counting the bits or the macroblocks in a module BC. The insertion of a header element including a resynchronization marker is then effected by a marking module MARK when the video packet reaches the required size. When the decision module DEC switches the interrupter to position 2, the macroblocks which the decision module has decided to exclude are excluded from the coding by a module which carries out an exclusion step EXC. After each exclusion step EXC, a header element including a resynchronization marker is inserted in the binary data stream by module MARK. The video packets VP corresponding to those described in FIGS. 2a and 2d are thus obtained from formatter FRMT.

The arrangement of the various modules in this coder corresponds to a specific embodiment, not intended to exclude other embodiments that may be apparent to one skilled in the art.

Figure 4:
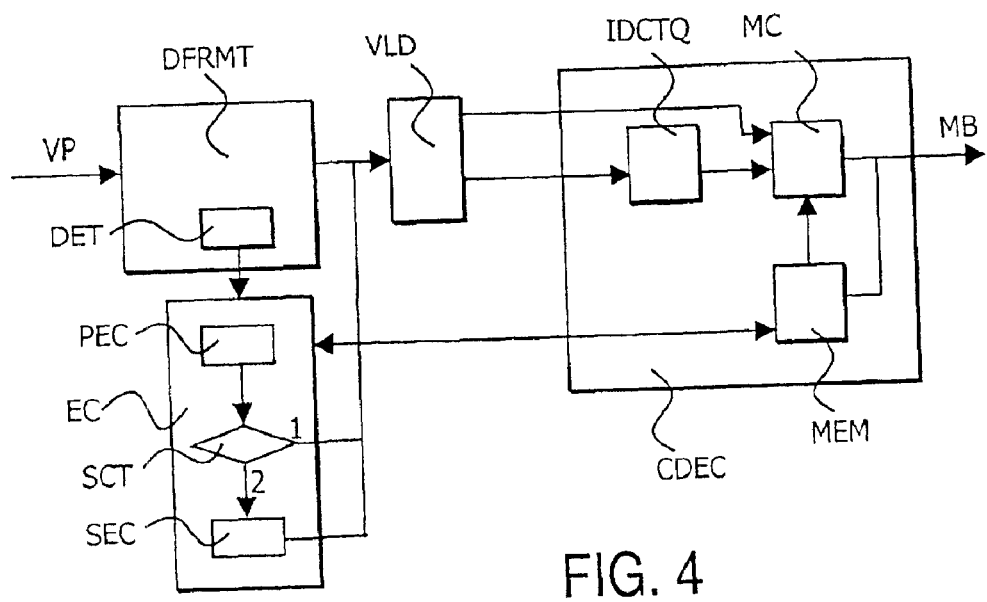
FIG. 4 is a schematic diagram of a video decoder according to the invention.

FIG. 4 is a schematic diagram of a video decoder according to the invention. The decoder receives the coded binary data stream, for example in the form of video packets VP represented in FIG. 2, via a transmission channel (not shown). It responds by providing a sequence of decoded macroblocks MB. The decoder includes a deformatter DFRMT, a variable length word decoder VLD, a decoding stage CDEC. The decoding stage CDEC includes an inverse transform IDCTQ, a motion compensator MC and a memory MEM. Deformatter DFRMT comprises a detection module DET for the purpose of detecting uncoded macroblocks at at least one point in the binary data stream. The detection module DET is coupled to an error concealment module EC which is designed to be particularly activated for uncoded macroblocks that have been detected in the detection step DET. The error concealment module EC activated thereby reconstructs the macroblock.

The decoder according to the invention is characterized in that the detection module DET of uncoded macroblocks comprises a detection submodule for the purpose of detecting irregular intervals between resynchronization markers. Accordingly, the substep detects uncoded macroblocks using a detection of a resynchronization marker at the very point where macroblocks are not coded. In an embodiment of the invention relating to video packets formed by counting the macroblocks to achieve the required size, the decoder according to the invention counts the macroblocks present in the preceding video packet, starting at each resynchronization marker and, using the number of the first macroblock of the video packet it has just received and the number of the first macroblock of the video packet that starts, it deduces that same macroblocks have not been coded, thus detecting the insertion of a resynchronization marker at the point where the macroblocks have not been coded. The detection module DET may also be used for detecting, for example, errors in the binary data stream, said errors being concealed by the error concealment module coupled to said detection module DET. The reconstructed macroblocks are inserted into the output data of the deformatter DFRMT according to the corresponding sequence of the image or video object packet. However, such insertion of reconstructed data may be effected at several points or steps in the decoding method depending on the effectively reconstructed data.

The decoder presented here thus implements a method of decoding a binary data stream including coded data of a digital image with macroblocks, including a step of detecting macroblocks that are uncoded in at least one point of the binary data stream, an error concealment step EC principally activated for uncoded macroblocks detected in the detection step DET, characterized in that the step of detecting uncoded macroblocks includes a detection substep for the purpose of detecting irregular intervals between the resynchronization markers.

The decoding method described here may be applied to the standards MPEG-4, H26L and others.

In an advantageous embodiment illustrated in FIG. 4, the error concealment module EC includes first means PEC for primary reconstruction, that is to say, for example, temporal reconstruction of the error, means SCT for appraising this first reconstruction which decides whether to modify (as in case 2) the error reconstruction or validate (as in case 1) the first reconstruction, second means SEC for secondary reconstruction, that is to say, for example, spatial reconstruction, which is activated when the appraisal step decides upon modification of the error reconstruction. For example, an uncoded macroblock belonging to an internally coded image (I for Intracoded) will be better corrected by spatial error concealment, whereas an uncoded macroblock belonging to an externally coded image (P or B for interceded) will be better corrected by spatial or temporal error concealment. The advantageous embodiment presented here thus allows to obtain optimized reconstruction by trying and testing various types of error concealment. One versed in the art may thus employ various means for reconstruction followed by evaluation tests of the quality of the reconstruction (spatial continuity tests . . . ) according to combinations of varying complexity without exceeding the scope of the invention.

There are many ways to implement the functions disclosed in the method steps according to the invention by the use of software and/or hardware available to a person of ordinary skill in the art. For this reason, the Figures are schematic in nature. Accordingly, whereas the Figures illustrate various functions carried out by various blocks, this is not to say that a single unit of software and/or hardware may not carry out several functions. This does not exclude either that a combination of software and/or hardware means permits to carry out a single function.

It follows that many modifications may be effected by a person skilled in the art without thereby exceeding the intent and scope defined in the following claims.

What is claimed is:

1. A method of coding a digital image comprising macroblocks in a binary data stream, the method comprising:
   an estimation step, for macroblocks, of a capacity to be reconstructed via an error concealment method,
   a decision step for macroblocks to be excluded from the coding, a decision to exclude a macroblock from coding being made on the basis of the capacity of such macroblock to be reconstructed,
   characterized in that it also includes a step of inserting a resynchronization marker into the binary data stream after the exclusion of one or more macroblocks.

2. A coding method as claimed in claim 1, characterized in that the decision step includes a substep of evaluation of the reduction of the binary data stream effected by exclusion of the macroblocks, the decision to exclude macroblocks being made as a function of a reduction of the binary data stream resulting from such exclusion.

3. A coding method as claimed in one of the claims 1 and 2, characterized in that it includes a calculation step of a binary data stream output rate, the decision to exclude macroblocks being made on the basis of this binary data stream output rate.

4. A coder for the purpose of coding a digital image comprising macroblocks in a binary data stream, comprising
   an estimation module for the purpose of estimating a capacity of macroblocks to be reconstructed by an error concealment method,
   a decision module intended to decide upon an exclusion of the coding for macroblocks, a decision to exclude a macroblock being made on the basis of the capacity of said macroblock to be reconstructed,
   characterized in that it also includes a module for inserting a resynchronization marker in the binary data stream following the exclusion of one or more macroblocks.

5. A coding method as claimed in claim 3, characterized in that it includes one or more modules for the purpose of carrying out the characteristic steps of one of the claims 2 and 3.

6. A coded data of a digital image including macroblocks embedded in a, binary data stream, the macroblocks are not coded in the binary data stream in at least one location of the binary data stream, said uncoded macroblocks having a capacity to be reconstructed by an error concealment method,
   characterized in that a resynchronization marker is present in the binary data stream at the point where macroblocks are not coded.

7. A method of decoding a binary data stream containing coded data of a digital image including macroblocks, said binary data stream containing resynchronization markers at regular intervals, including:
   a detection step for uncoded macroblocks in at least one location of the binary data stream,
   an error concealment step notably activated for uncoded macroblocks which are detected in the detection step,
   characterized in that the detection step for uncoded macroblocks includes a detection substep for the purpose of detecting irregular intervals between the resynchronization markers.

8. A decoder for decoding a binary data stream containing coded data of a digital image comprising macroblocks, including:
   a detection module for detecting uncoded macroblocks in at least one location of the binary data stream,
   an error concealment module intended to be notably activated for the uncoded macroblocks that are detected by the detection module, characterized in that the detection module for uncoded macroblocks includes a detection submodule for the purpose of detecting irregular intervals between the resynchronization markers.

9. A "computer program" product for a coder comprising a series of functions and a collective resource that the functions access, characterized in that the "computer program" product includes a set of instructions which, when loaded into such a coder, run the method claimed in one of the claims 1 to 3 with respect to the coder.

10. A "computer program" product for a decoder comprising a series of functions and a collective resource that the functions access, characterized in that the "computer program" product includes a set of instructions which, when loaded into such a decoder, run the method as claimed in claim 7 with respect to the decoder.

* * * * *